United States Patent
Koike et al.

(10) Patent No.: US 10,055,050 B2
(45) Date of Patent: Aug. 21, 2018

(54) TOUCH PANEL DETECTION AREA MODIFICATION

(71) Applicant: FUJITSU LIMITED, Kawasaki-shi, Kanagawa (JP)

(72) Inventors: Hideyuki Koike, Kawasaki (JP); Susumu Kashiwagi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/051,630

(22) Filed: Feb. 23, 2016

(65) Prior Publication Data

US 2016/0283026 A1 Sep. 29, 2016

(30) Foreign Application Priority Data

Mar. 24, 2015 (JP) ................. 2015-061090

(51) Int. Cl.
*G06F 3/041* (2006.01)
*G06F 3/0488* (2013.01)
*G06F 3/0484* (2013.01)

(52) U.S. Cl.
CPC ........ *G06F 3/0416* (2013.01); *G06F 3/04842* (2013.01); *G06F 3/04886* (2013.01)

(58) Field of Classification Search
None
See application file for complete search history.

(56) References Cited

U.S. PATENT DOCUMENTS

| 2005/0184972 | A1* | 8/2005 | Tashiro | G06F 1/1626 345/173 |
| 2009/0174679 | A1 | 7/2009 | Westerman | |
| 2010/0053092 | A1* | 3/2010 | Chen | G06F 3/04886 345/173 |
| 2010/0207894 | A1* | 8/2010 | Tsuei | G06F 3/04886 345/173 |
| 2011/0090257 | A1* | 4/2011 | Ko | G06F 3/0418 345/660 |

(Continued)

FOREIGN PATENT DOCUMENTS

| JP | 2009-217814 A | 9/2009 |
| JP | 2012-194997 A | 10/2012 |

(Continued)

OTHER PUBLICATIONS

Extended European search report of European Application No. 16156095.8 dated Aug. 26, 2016.

*Primary Examiner* — Kent Chang
*Assistant Examiner* — Benjamin Morales Fernandez
(74) *Attorney, Agent, or Firm* — Maschoff Brennan (57) ABSTRACT

An electronic device includes a touch panel that includes a touch sensor panel configured to detect coordinates of a touch position provided on a screen configured to display an object for an input operation; and a processor coupled to the touch panel and configured to: suppress output of coordinate information of a contact position on an invalid area when a contact to the invalid area set in a part of the screen of the touch sensor panel is detected; output coordinate information of a contact position of the contact to an area other than the invalid area when a contact to the area other than the invalid area is detected; and change the invalid area in accordance with a degree of overlap of a display area of the object and a standard invalid area.

13 Claims, 10 Drawing Sheets

(56) References Cited

U.S. PATENT DOCUMENTS

| | | | |
|---|---|---|---|
| 2011/0285645 A1* | 11/2011 | Cho | G06F 3/0416 345/173 |
| 2011/0291970 A1* | 12/2011 | Liu | G06F 3/0416 345/173 |
| 2012/0075212 A1* | 3/2012 | Park | G06F 3/04886 345/173 |
| 2013/0234982 A1* | 9/2013 | Kang | G06F 3/044 345/174 |
| 2013/0285956 A1* | 10/2013 | Kamii | G06F 3/0416 345/173 |
| 2013/0335453 A1* | 12/2013 | Lim | G09G 5/373 345/661 |
| 2014/0049502 A1 | 2/2014 | Santos | |
| 2014/0055367 A1* | 2/2014 | Dearman | G06F 3/0488 345/173 |
| 2014/0184572 A1 | 7/2014 | Ito et al. | |
| 2014/0289668 A1* | 9/2014 | Mavrody | G06F 3/04886 715/781 |
| 2014/0306905 A1 | 10/2014 | Kim et al. | |
| 2014/0340338 A1* | 11/2014 | Kim | G06F 3/0488 345/173 |
| 2015/0015506 A1* | 1/2015 | Lares | G06F 3/0488 345/173 |

FOREIGN PATENT DOCUMENTS

| | | |
|---|---|---|
| JP | 2014-063222 A | 4/2014 |
| JP | 2014-130450 A | 7/2014 |

\* cited by examiner

| RANGE OF Y COORDINATE | RANGE OF X COORDINATE | ATTRIBUTE INFORMATION | |
|---|---|---|---|
| ALL | 0 ~ Smax1 | | |
| ALL | Smax2 ~ DW | | |
| 0 ~ y21 | 0 ~ Smax1 | | 64 |
| y21 ~ y22 | Smax1*30% | | 65 |
| y22 ~ DH | 0 ~ Smax1 | | 66 |
| 0 ~ y31 | Smax2 ~ DW | | 67 |
| y31 ~ y32 | DW-Smax2*30% ~ DW | | 68 |
| y32 ~ DH | Smax2 ~ DW | | 69 |

| RANGE OF Y COORDINATE | RANGE OF X COORDINATE | ATTRIBUTE INFORMATION | |
|---|---|---|---|
| ALL | 0 ~ Smax1 | | |
| ALL | Smax2 ~ DW | | |
| 0 ~ y21 | 0 ~ Smax1 | | 64 |
| y21 ~ y22 | 0 ~ x21+(x22-x21)*30% | | 65 |
| y22 ~ DH | 0 ~ Smax1 | | 66 |
| 0 ~ y31 | Smax2 ~ DW | | 67 |
| y31 ~ y32 | x32-(x32-x31)*30% ~ DW | | 68 |
| y32 ~ DH | Smax2 ~ DW | | 69 |

TOUCH PANEL DETECTION AREA MODIFICATION

CROSS-REFERENCE TO RELATED APPLICATION

This application is based upon and claims the benefit of priority of the prior Japanese Patent Application No. 2015-061090, filed on Mar. 24, 2015, the entire contents of which are incorporated herein by reference.

FIELD

The embodiments discussed herein are related to an electronic device, a control method, and a storage medium.

BACKGROUND

Electronic devices, such as so-called smart phone, tablet, and the like, on which a touch panel is mounted, have been widely used. A touch panel detects, for example, a touch operation performed thereon by a user and outputs coordinate information indicating an operation position thereof. An electronic device acquires, based on the coordinate information indicating the operation position received from the touch panel and coordinate relationship information for a display panel and the touch panel, the coordinate position of the display panel which corresponds to the coordinate position indicating the operation position. Then, the electronic device specifies a display object displayed in the acquired coordinate position of the display panel and executes processing appropriate to the display object.

In many cases, a user holds such an electronic device with his or her hand to operate the electronic device. In such a case, the fingers and hand with which the user holds the electronic device may happen to touch the touch panel, and thus, a touch operation that is not intended by the user may be detected.

In order to reduce such false detection of the touch operation, a technology in which a touch detection invalid area having a predetermined width is set in an outer edge part of a display surface on which a touch panel is mounted has been known. For example, Japanese Laid-open Patent Publication No. 2012-194997, Japanese Laid-open Patent Publication No. 2014-130450, and the like discuss related art.

However, in a related technology described in Japanese Laid-open Patent Publication No. 2012-194997, part of a display screen which is located at an outer edge thereof and has a predetermined width is an invalid area (an insensitive area) at all times and an operation button and the like are not displayed therein. Therefore, in a mobile terminal in which the size of the display screen is limited, the display screen is not effectively used.

On the other hand, in a related technology described in Japanese Laid-open Patent Publication No. 2014-130450, a predetermined range is set at an outer edge of an input area. Then, if an object to which a touch point in the range which a user touched corresponds and another object to which another touch point out of the predetermined range corresponds are objects related to each other, it is assumed that the touch point in the predetermined range which the user touched is effective, and thus, processing is executed. On the other hand, if the objects are not related to each other, the touch point in the predetermined range which the user touched is processed as an invalid input. That is, the technology described in Japanese Laid-open Patent Publication No. 2014-130450 is a technology in which a plurality of related objects are displayed and, only when the plurality of objects is simultaneously touched, a touch point in the predetermined range which the user touched is valid. For an operation performed on a single object, the above-described effect is not exhibited.

In each of the above-described related technologies, a touch in an invalid area is invalid, and therefore, a touch to a single object a part of which overlaps with the invalid area is valid only when a touch operation is performed on a part of the object located in a display area other than the invalid area with which the part of the object overlaps. If the size of the object is small, a part of the object in which a touch operation is effective is smaller, and operability is remarkably reduced.

When a slide operation in which a start point is a point in the invalid area is performed, the start point of a slide is not detected. Therefore, even when a slide operation is performed thereafter in a part out of the invalid area, the slide operation is not recognized as an intended operation by the electronic device. As described above a problem arises in which user operability is deteriorated. It is therefore desired that even an object that overlaps with an invalid area may be used with good operability and a limited display screen may be effectively used.

SUMMARY

According to an aspect of the invention, an electronic device includes a touch panel that includes a touch sensor panel configured to detect coordinates of a touch position provided on a screen configured to display an object for an input operation; and a processor coupled to the touch panel and configured to: suppress output of coordinate information of a contact position on an invalid area when a contact to the invalid area set in a part of the screen of the touch sensor panel is detected; output coordinate information of a contact position of the contact to an area other than the invalid area when a contact to the area other than the invalid area is detected; and change the invalid area in accordance with a degree of overlap of a display area of the object and a standard invalid area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS (First Embodiment)

A first embodiment will be described below with reference to FIG. 1 to FIG. 7. In FIG. 1 to FIG. 7, the same members are denoted by the same reference character.

Figure 1:
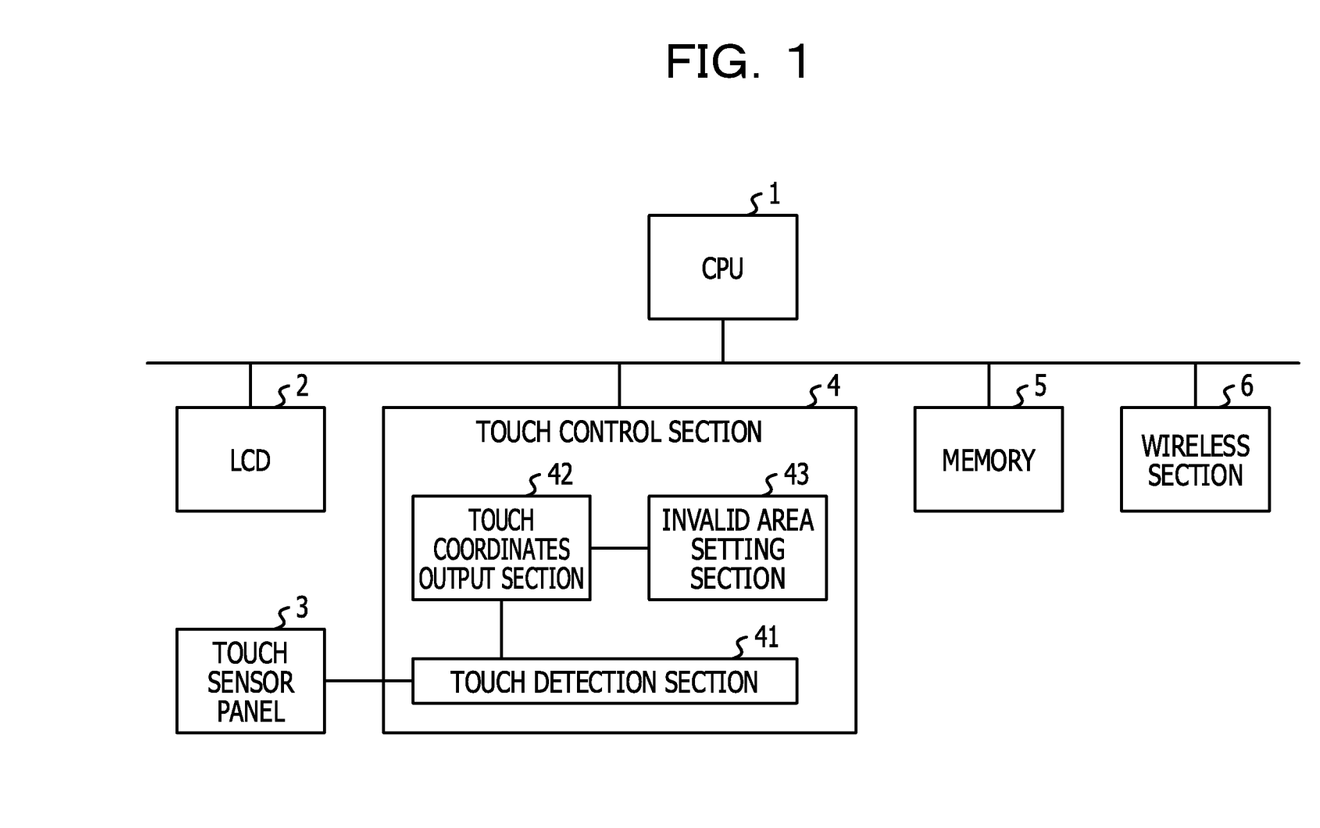
FIG. 1 is a system configuration diagram according to a first embodiment.

FIG. 1 is a system configuration diagram illustrating an example of a mobile terminal device including a touch panel. As illustrated in FIG. 1, in general, the mobile terminal device includes, under control of a central processing unit (CPU) 1 and an operating system (OS), which is not illustrated, a display panel 2, such as a liquid crystal display (LCD) and the like, a touch sensor panel 3 provided over the display panel 2 and configured to detect a touch operation, a touch control section 4 configured to detect a touch operation to the touch sensor panel 3, calculate position coordinates of the touch operation, and output the position coordinates to a higher level device or a display control program (not illustrated), a memory 5 configured to store various types of data and programs (including the OS), and a wireless section 6 used for providing connection to a local area network (LAN) or a public wireless line. The above-described members as a whole form a kind of computer, and the display panel 2 and the touch sensor panel 3 together are referred to as a touch panel.

In the touch control section 4, a touch detection section 41 scans the touch sensor panel 3. When a touch operation is detected somewhere on a sensor surface, the touch detection section 41 acquires coordinate values thereof. Whether or not the coordinate values are values representing a position contained in an invalid area set by an invalid area setting section 43 is checked by a touch coordinates output section 42. As a result, if the coordinate values are values representing a position contained in the invalid area, it is determined that the touch operation is invalid and the coordinate values are not output. On the other hand, if the coordinate values are not values representing a position contained in the invalid area, the coordinate values are output to a higher level device or a display control program. In this embodiment, a setting method of the invalid area setting section 43 has features. That is, the setting method is characterized in that a part of an invalid area is dynamically changed in accordance with the positional relationship of displayed objects.

Figure 2:
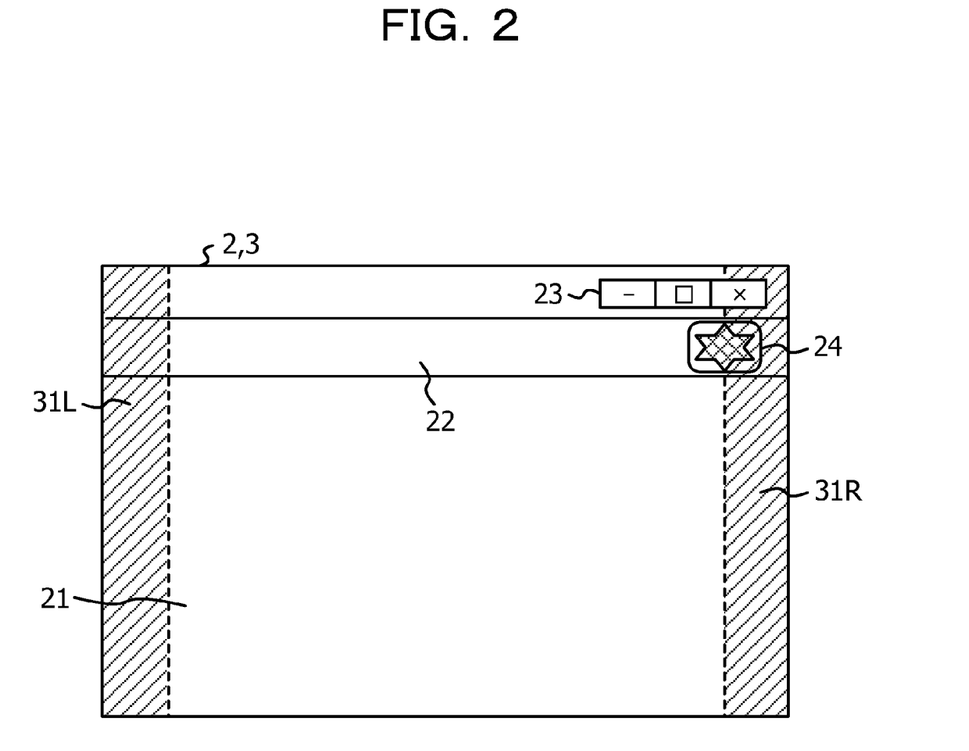
FIG. 2 is a view illustrating a problem in a known technology.

FIG. 2 is a view illustrating a problem in a known technology. As an example, a browser screen used for browsing the Internet will be described. As illustrated in FIG. 2, the reference character 21 denotes a browser screen, and the browser screen 21 is displayed full screen on the display panel 2. In the browser screen 21, normally, there is a tool bar 22 in an upper side part thereof. In the tool bar 22, one or more icons 24, such as an operation button and the like, are displayed. There is an icon section 23 used for operating the browser screen itself in an upper part of the tool bar 22, and the icon section 23 includes operation buttons, such as minimization, maximization, end, and the like. Images, such as the icons, the buttons, check boxes, and the like, displayed on the screen in order for a user to operate an electronic device will be referred to as input operation objects.

Invalid areas 31L (left side) and 31R (right side) are set in left and right edge parts of the touch sensor panel 3.

It is needless to say that, although the browser screen has been described as an example above, the present disclosure may be applied to an arbitrary application screen other than a browser in a similar manner.

As illustrated in FIG. 2, an object of the icon 24 overlaps with the right side invalid area 31R substantially in the right half part thereof. Therefore, even when a touch operation is performed on the right half part of the icon 24, the touch operation is invalid, and the user is desired to perform a touch operation somewhere in the left half part of the icon 24. In a mobile terminal, a screen itself is small, the object displayed thereon is also small, and thus, a valid touch operation may be performed only on a half part of the screen. Therefore, the operability is disadvantageously affected. However, if the display position of the operation icon is initially set in a part other than the invalid areas, the screen is not effectively used.

Figure 3:
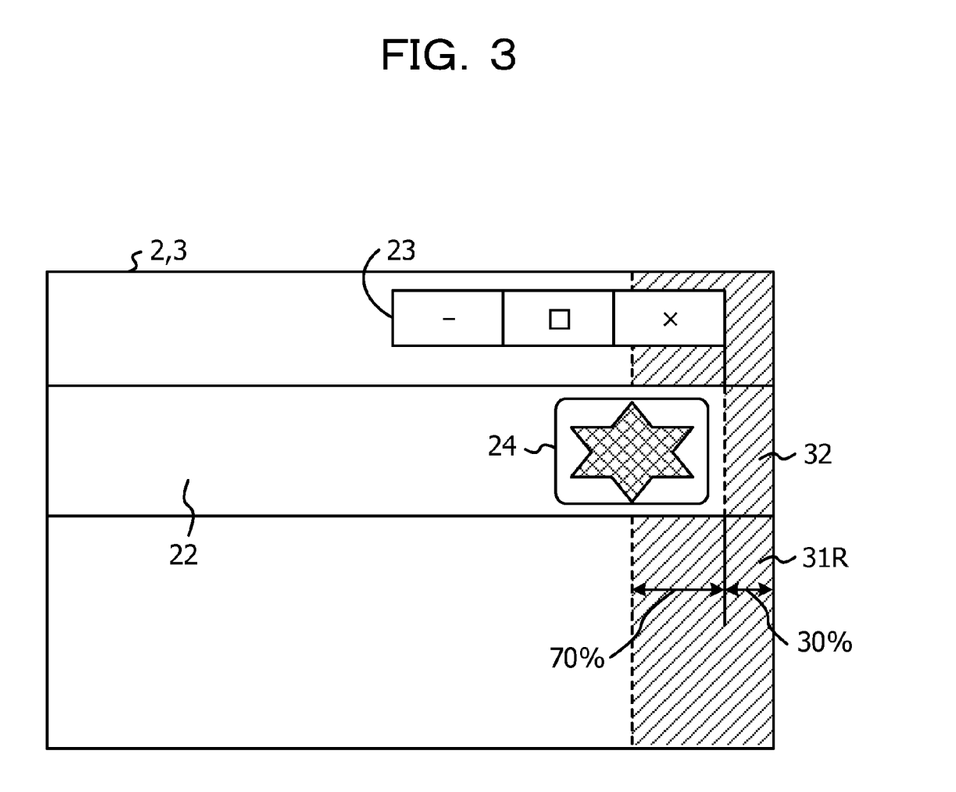
FIG. 3 is a view illustrating an operation according to the first embodiment.

FIG. 3 is a view illustrating an operation according to the first embodiment. FIG. 3 corresponds to an enlarged view of an upper right part of FIG. 2. As illustrated in FIG. 3, in this embodiment, in displaying the object of the icon 24, when it is detected that the display area thereof overlaps with the right side invalid area 31R, the width of a part of the invalid area, which is located in an overlapping part, is reduced to 30% of a standard width. Thus, in most cases, substantially the entire display area of the icon 24 is excluded from the invalid area, and similar touch operability to that when an icon is a part other than the edge part of the screen may be achieved. In the above description, the corresponding part in each of the left and right side invalid areas is reduced to 30% of the standard width. However, the % value is arbitrary and may be set so as to differ between the left and right side invalid areas. Furthermore, how to hold the electronic device differs among users, and therefore, the % value may be changed by the user thereof.

Figure 4:
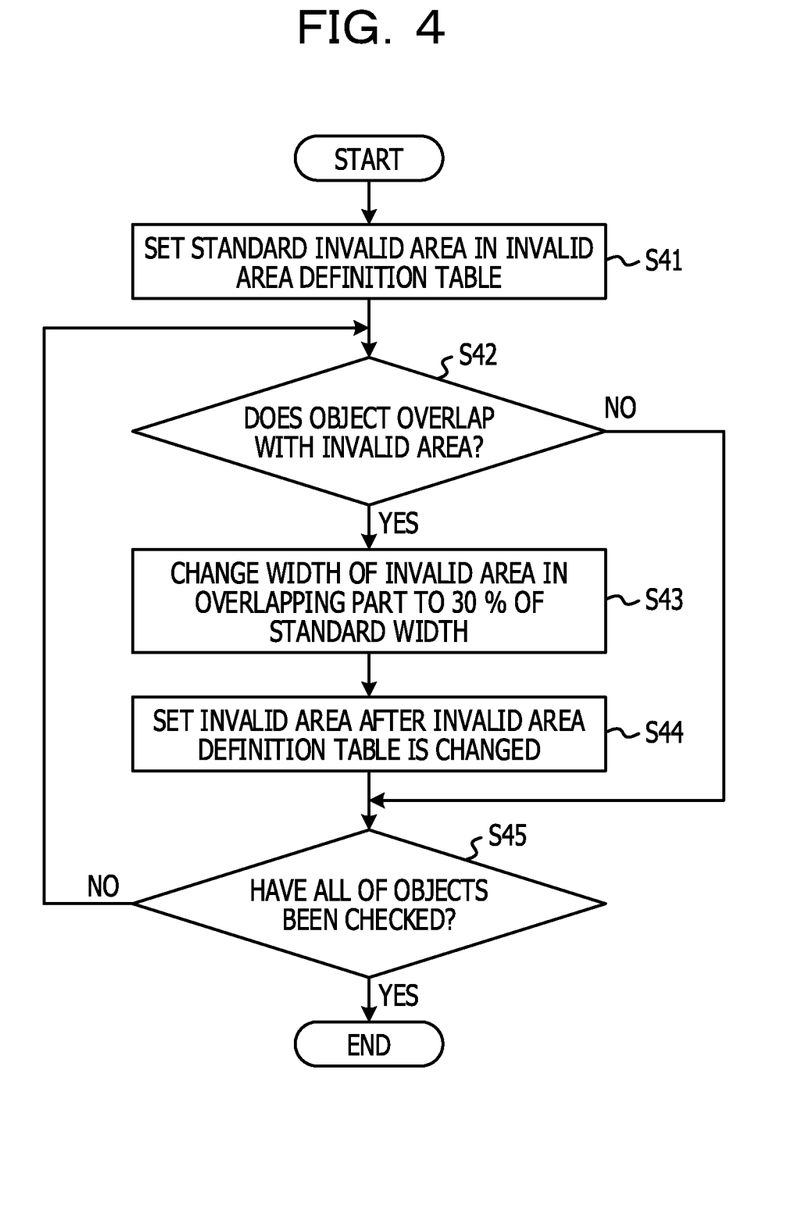
FIG. 4 is a flow chart of processing of a touch control section according to the first embodiment.

FIG. 4 is a flow chart of processing of the invalid area setting section 43 of the touch control section 4 according to the first embodiment. This processing flow is started when an input operation object is newly displayed or when the display position of the input operation object that has been already displayed is moved.

When the processing flow is started, first, the width of a standard invalid area is set in an invalid area definition table, which will be described later (S41).

Next, whether or not the display area of an object overlaps with the standard invalid area is checked (S42). In this case, if the display area of the object does not overlap with the standard invalid area (NO in S42), the process proceeds to the processing of S45.

If it is determined that the display area of the object overlaps with the standard invalid area (YES in S42), a value that is 30% of a standard value is calculated as the width of a part of the invalid area, which is located in an overlapping part (S43), the invalid area definition table is updated, based on the value (S44), and the process proceeds to the processing of S45. Details of the above-described calculation and update will be described later.

In S45, for all of the input operation objects that are display targets, whether or not the above-described processing is completed is checked. If the above-described processing is completed, the process is terminated and, if the above-described processing is not completed, the processing of S42 and the subsequent processing are repeated for a next object.

For the object displayed in the display panel 2, the display position, display size, display shape, various types of attributes, other related information of the object are stored in a predetermined area of the memory 5. Information of the display position and the display size of each object is read out sequentially from the predetermined area.

Next, each determination processing will be described with reference to FIG. 5 and FIG. 6.

Figure 5:
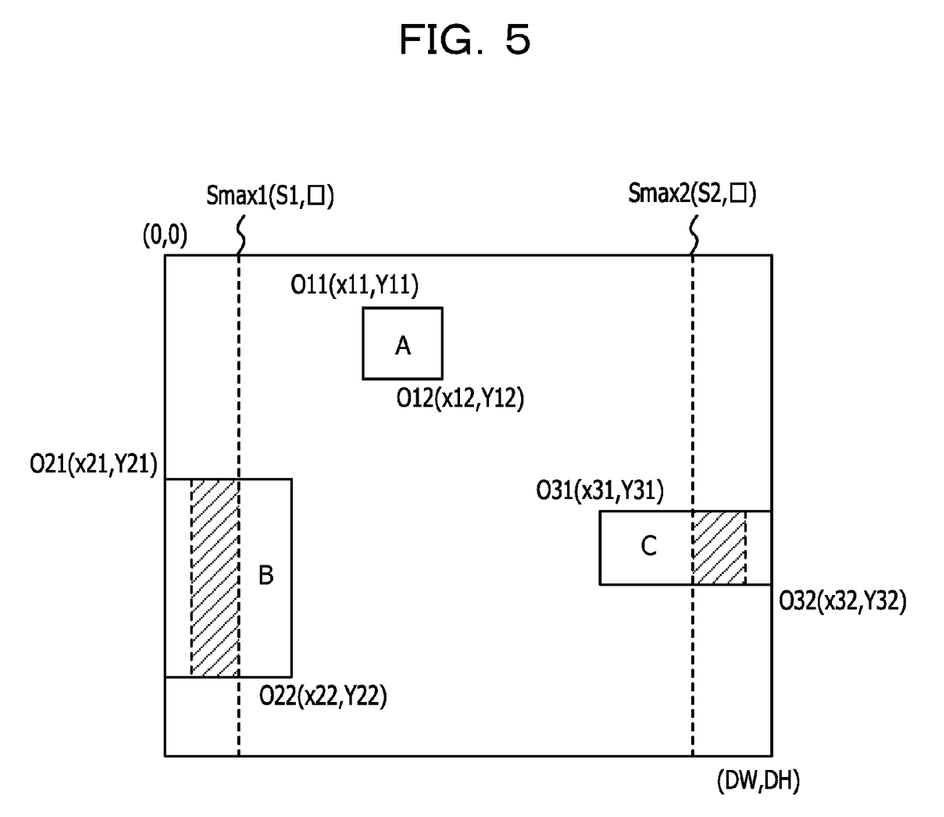
FIG. 5 is a chart illustrating a coordinate relationship according to the first embodiment.

FIG. 5 is a chart illustrating, assuming that the coordinate system of the display panel 2 and the coordinate system of the touch sensor panel 3 are the same, the coordinate systems and coordinate relationship with invalid areas and display areas of objects. In FIG. 5, the abscissa axis and the ordinate axis represent an X coordinate and a Y coordinate, respectively, and a point of origin is located in the upper left corner.

There may be a case where the sizes or the coordinate systems of the display panel 2 and the touch sensor panel 3 differ from each other. However, even in such a case, this embodiment may be employed.

In the example of FIG. 5, in the left side of the screen, an invalid area is set so as to have a width of Smax1 in an X coordinate direction and extend entirely in a Y coordinate direction. Furthermore, on the right side of the screen, an invalid area is set so as to have a width of (DW−Smax2) in the X coordinate direction and extend entirely in the Y coordinate direction. The coordinates (DW, DH) are XY coordinates at the lower right corner of the screen.

In FIG. 5, three types of objects A, B, and C are illustrated. As for the object A, the coordinates of the upper left corner O11 thereof are (x11, y11), and the coordinates of the lower right corner O12 thereof are (x12, y12). As for the object B, the coordinates of the upper left corner O21 thereof are (x21, y21), and the coordinates of the lower right corner O22 thereof are (x22, y22). As for the object C, the coordinates of the upper left corner O31 thereof are (x31, y31), and the coordinates of the lower right corner O32 thereof are (x32, y32).

In this case, in order to simplify the description, it is assumed that the shape of each object is rectangular and there are the invalid areas only in the left and right edge parts of the screen, not in the upper and lower edge parts thereof. However, it is needless to say that the present disclosure may be also applied to a case where an object has a shape other than a rectangular shape or a case where there are invalid areas in the upper and lower edge parts,.

The values of the widths Smax1 and (DW−Smax2) of the standard left and right side invalid areas may be the same, and also may be different from each other. The values may be arbitrarily set by the user.

In the processing of S42 of FIG. 4, whether or not an object and an invalid area overlap with each other is checked. Specifically, the X coordinate (xn1) of the left end of each object is compared to the right end coordinate Smax1 of the standard left side invalid area. Then, the X coordinate (xn2) of the right end of each object is compared to the left end coordinate Smax2 of the standard right side invalid area. As a result, if xn1<Smax1 (for the object B in FIG. 5) or xn2>Smax2 (for the object C in FIG. 5) is satisfied, it is determined that the object and the invalid area overlap with each other. On the other hand, if none of the above-described conditions is satisfied (for the object A in FIG. 5), it is determined that the object and the invalid area do not overlap with each other. The character n in (xn1) and the like described above is a generalized representation for a plurality of objects A, B, C . . . .

In the processing of S43 of FIG. 4, for the object (for example, the object B in FIG. 5) for which it is determined that the object and the invalid area overlap with each other, 30% of an overlapping part of the invalid area, which is located at an outer side thereof (that is, the left side of the left side invalid area and the right side of the right side invalid area) is left to remain as the invalid area, and 70% of the overlapping part is excluded from the invalid area. As a result, hatched parts of the object B and the object C in FIG. 5 are excluded from the invalid area. A touch operation may be correctly detected in the hatched parts, the coordinate values thereof may be output to a higher level device, and accordingly, operability may be ensured.

Figure 6:
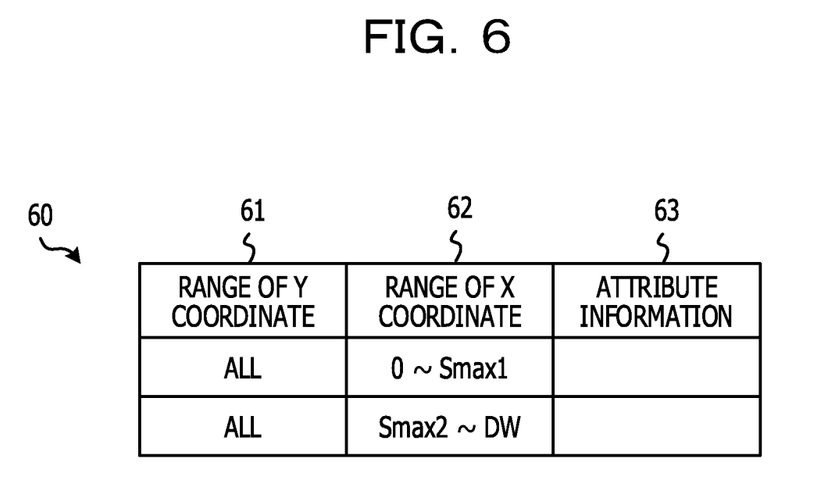
FIG. 6 is a table illustrating an example of an invalid area definition table according to the first embodiment.

FIG. 6 is a table illustrating an example of the invalid area definition table used for setting an invalid area. An invalid area definition table 60 may be provided as a resister of a hardware or a local memory in the touch control section 4. As another alternative, the invalid area definition table 60 may be provided in a predetermined address in the memory 5 so as to be referred to, as appropriate.

FIG. 6 illustrates a state where the standard invalid area is set in the processing of S41 of FIG. 4. The range of the Y coordinate, the range of the X coordinate, and attribute information and the like used for other processing are stored in a first column 61, a second column 62, and a third column 63, respectively. In the invalid area definition table 60 of FIG. 6, the first row defines the left side standard invalid area in FIG. 5. The second row defines the right side standard invalid area in FIG. 5.

As the processing of the touch coordinates output section 42 in FIG. 1, aside from the processing flow of FIG. 4, when a touch operation is detected somewhere in the touch sensor panel 3, there is touch validity determination processing (not illustrated) in which the coordinates of the touch position thereof are compared to values in the table of FIG. 6 and whether the touch operation is valid or invalid is determined. However, the touch validity determination processing is similar to known processing, and therefore, the description of details thereof will be omitted.

Figure 7:
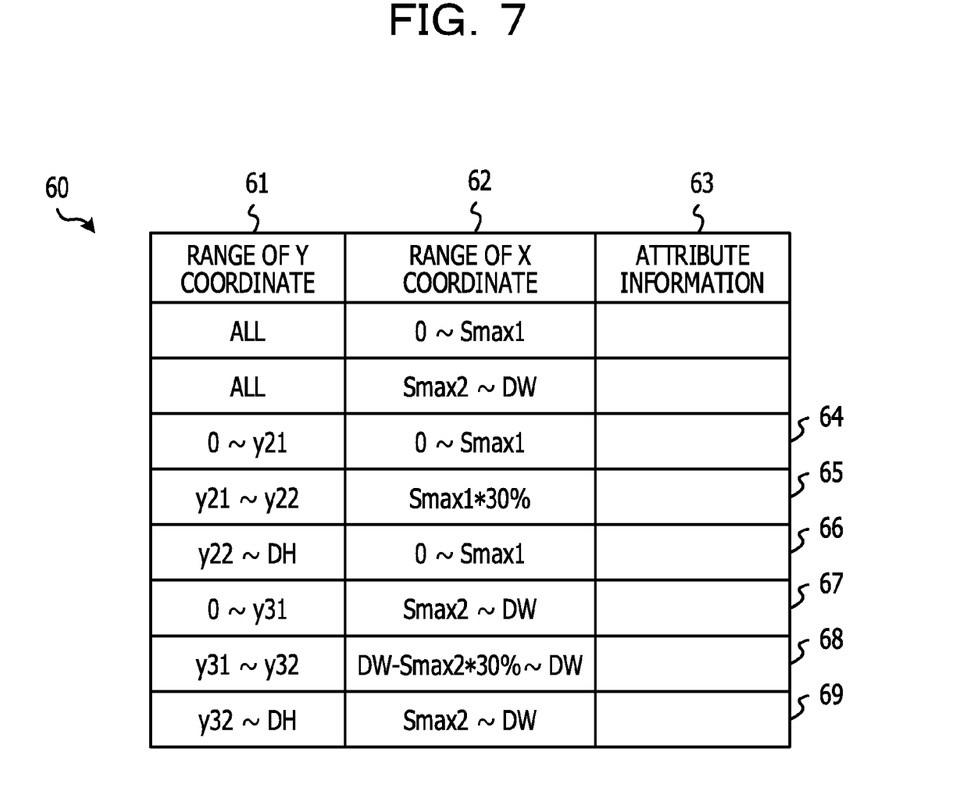
FIG. 7 is a table illustrating an example of update of the invalid area definition table according to the first embodiment.

FIG. 7 is a table illustrating an example of the invalid area definition table 60 updated with the invalid area after being changed in the processing of S44 in FIG. 4 and, similar to FIG. 6, the first row and the second row define standard invalid areas. The third row 64 defines an area from the upper end of the left side invalid area to the upper end of the object B. The fourth row 65 defines an invalid area at the left side of the object B. The fifth row 66 defines an area from the lower end of the object B to the lower end of the left side invalid area. The sixth row 67 defines an area from the upper end of the right side invalid area to the upper end of the object C. The seventh row 68 defines an invalid area at the right side of the object C. The eighth row 69 defines an area from the lower end of the object C to the lower end of the right side invalid area.

In FIG. 7, the definitions of the standard invalid areas described in the first and second rows in FIG. 6 are left as it is. This is because, in the touch validity determination processing, whether or not coordinates at which the touch operation was detected are contained in either one of the standard invalid areas is determined, only if the coordinates are contained in either one of the standard invalid areas, comparisons with the respective coordinate ranges of the rows 64 to 69 in FIG. 7 are performed, and thus, the processing speed when none of objects overlaps with the invalid areas is increased.

(Second Embodiment)

In the above-described first embodiment, when an object overlaps with a standard invalid area even for a little, the range of the X coordinate of a part of the invalid area, which is located in an overlapping part, is reduced to 30% of the standard invalid area across the board. In a second embodiment, control is performed such that the area of a part in which an object and an invalid area overlap each other is 30% of the display area of the object itself. Thus, in a range with which operability is not deteriorated, the width of the invalid area is maintained to be as close to a standard width as possible, and thereby, a miss operation stopping function may be ensured. Also in this case, the value of 30%, which has been described above, is merely an example. The % value may be arbitrary selected, and also may be changed by the user.

Figure 8:
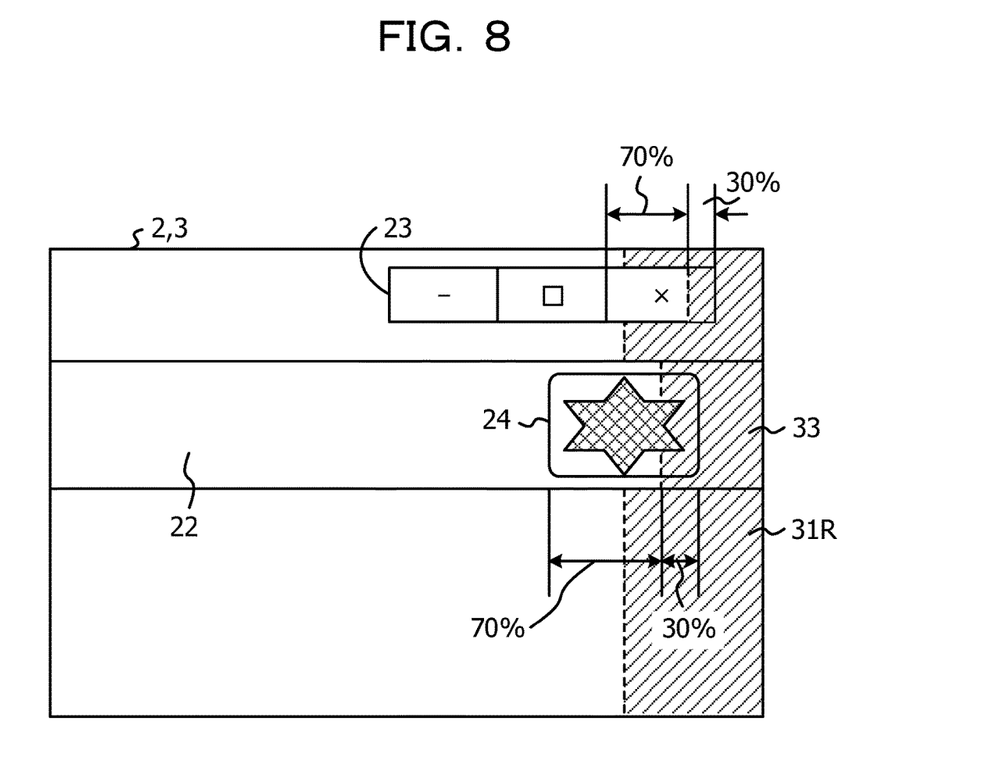
FIG. 8 is a view illustrating an operation according to a second embodiment.

FIG. 8 is a view illustrating the second embodiment. Unlike the example of FIG. 3, as for the display area of an object 22 which overlaps with the standard invalid area 31R, only 30% of the object 22 at the right side remains as the invalid area, and 70% of the object 22 at the left side is an area in which a touch operation may be performed. Normally, the user performs a touch operation toward a center part of the object 22. Thus, even when about 30% of the object 22 at one side is made to be an invalid area, the operability is not deteriorated so badly. On the other hand, the area of the remaining invalid area is larger than that in the example of FIG. 3, except for a case where the right end of the object 22 is located at a very right end of the display screen. Therefore, an effect of stopping an miss operation by an improper touch may be ensured.

Figure 9:
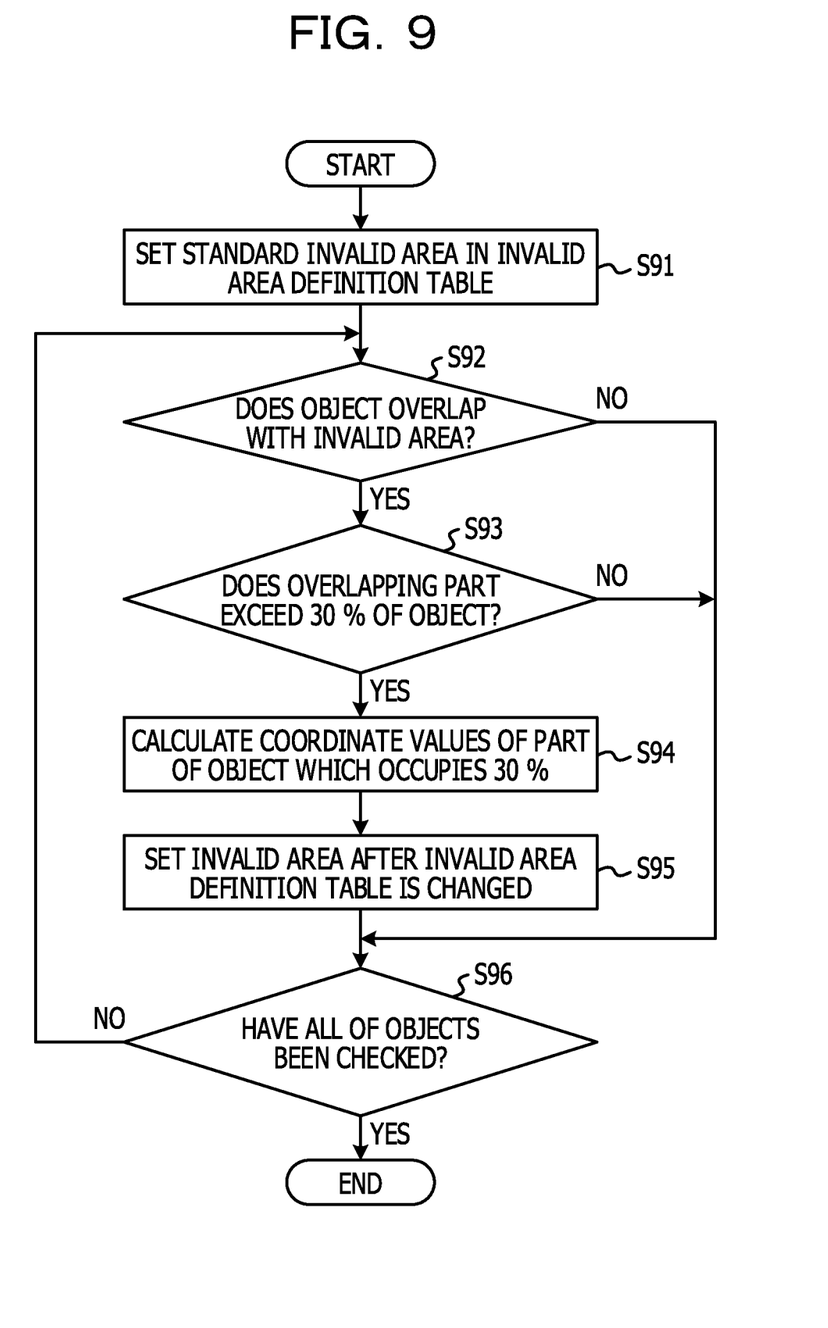
FIG. 9 is a flow chart of processing of a touch control section according to the second embodiment.

FIG. 9 is a flow chart illustrating invalid area setting processing of the touch control section 4 according to the second embodiment. Similar to the example of FIG. 4, this processing flow is started when an input operation object is newly displayed or when the display position of an already displayed input operation object is moved.

When the processing flow is started, the touch control section 4 first sets the width of a standard invalid area in an invalid area definition table, which will be described later (S91).

Next, the touch control section 4 checks whether or not the display area of an object overlaps with the standard invalid area (S92). In this case, if the display area of the object does not overlap with the standard invalid area (NO in S92), the process proceeds to the processing of S96.

If it is determined that the display area of the object overlaps with the standard invalid area (YES in S92), the touch control section 4 checks whether or not an overlapping part exceeds 30% of the entire display area of the object 22 (S93). If the overlapping part does not exceed 30% of the entire display area of the object 22 (NO in S93), the process proceeds to processing of S96.

If the overlapping part exceeds 30% of the entire display area of the object 22 (YES in S93), the touch control section 4 calculates the left side coordinate value of the overlapping part that corresponds to 30% of the display area of the object 22 (S94). The touch control section 4 additionally updates the invalid area in the invalid area definition table 60, based on a result of the calculation (S95). Details of the calculation will be described later.

In S96, for all of the input operation objects that are display targets, the touch control section 4 checks whether or not the above-described processing is completed. If the processing is completed, the process is terminated. If the processing is not completed, the processing of S92 and the subsequent processing are repeated for a next object.

The processing of S91 and the processing of S92 described above are similar to the processing of S41 and the processing of S42 in FIG. 4, respectively.

To describe based on the example of FIG. 5, in the processing of S93 described above, whether or not the ratio of (Smax1−x21) to (x22−x21) exceeds 30% may be determined for the object B, and whether or not the ratio of (x32−Smax2) to (x32−x31) exceeds 30% may be determined for the object C.

In the processing of S94, for the object B, 30% of the length of the object B in a left-right direction is added to the left end coordinate of the object B, and thus, the calculated coordinate may be set as the right end coordinate of the invalid area. Specifically, (x22−x21)×30% may be added to x21. For the object C, 30% of the length of the object C in the left-right direction may be subtracted from the right end coordinate of the object C, and thus, the calculated coordinate may be set as the left end coordinate of the invalid area. Specifically, (x32−x31)×30% may be subtracted from x32.

Figure 10:
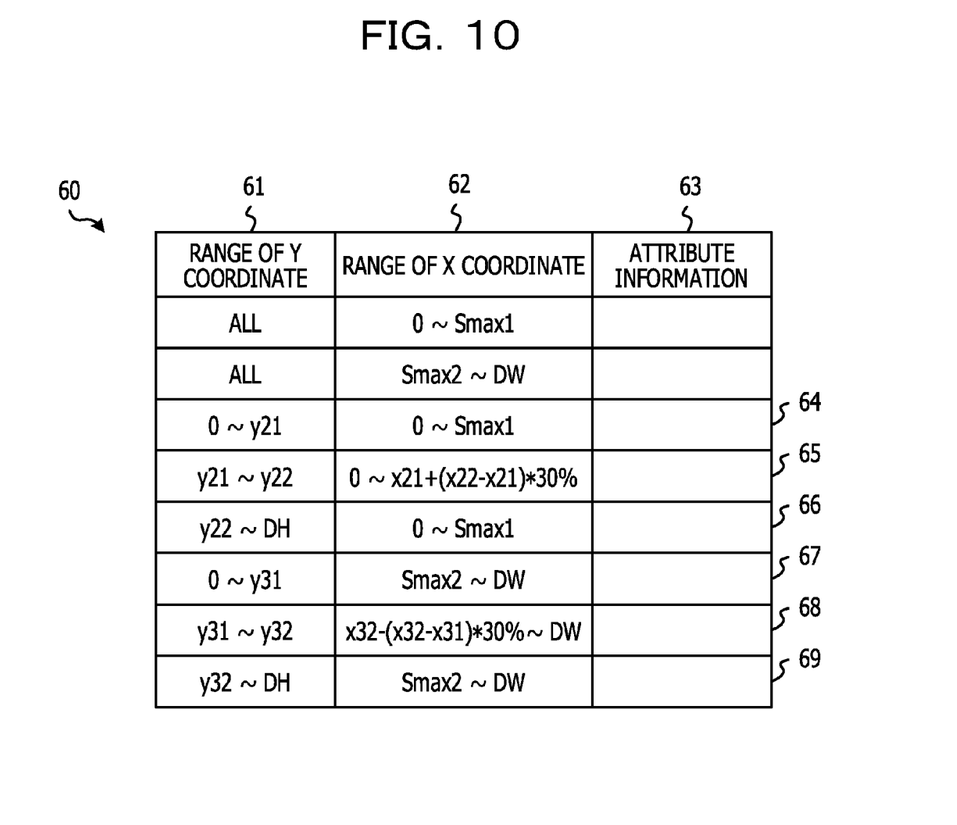
FIG. 10 is a table illustrating an example of update of an invalid area definition table according to the second embodiment.

FIG. 10 illustrates a state of the invalid area definition table 60 after the processing of FIG. 9 is executed. What each row indicates is similar to that in FIG. 7.

(Modified Example)

In the above-described embodiment, as a method used in a case where the invalid area is changed, the invalid area definition table 60 in which the range of the X coordinate and the range of the Y coordinate of each rectangular invalid area obtained by dividing an invalid area into a plurality of rectangular areas by an overlapping object. As another method, a valid area table in which a rectangular area in a standard invalid area, which has been excluded from the invalid area to be valid, is defined may be provided. In any one of the above-described cases, each rectangular area may be defined by the coordinates of the upper left corner and the coordinates of the lower right corner of the rectangular area, instead of the range of the X coordinate and the range of the Y coordinate which have been described above.

There are a case where, as in the icon section 23 of FIG. 2, a plurality of operation input objects are combined, and also a case where, as in a hierarchical menu in which lower level menus are sequentially displayed as the user selects, an object formed by a combination of a plurality of sub-objects. However, in such cases, the processing of FIG. 4 and the processing of FIG. 9 are performed on each individual sub-object.

In accordance with the type of an object, the first embodiment and the second embodiment, which have been described above, may be used in combination. In such a case, as one of pieces of attribute information of the object, a flag indicating which one of the processing of the first embodiment and the processing of the second embodiment is to be performed is contained. First, in processing each object according to first embodiment, only objects for which the flag indicates the first embodiment are processed. Subsequently, in processing each object in accordance with the second embodiment, only objects for which the flag indicates the second embodiment are processed.

In the system configuration of FIG. 1, the touch control section determines whether or not the position of a touch operation, which has been detected, is in the invalid area. Then, only if it is determined that the position of the touch operation is not in the invalid area, the touch operation is output to a higher level device. The processing of updating the invalid area definition table or the processing of determining whether or not a touch operation is in an invalid area may be performed by a higher level device or a higher level program (the OS or the like).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device, comprising:
    a screen which displays a plurality of objects, the screen having an effective area where an input operation is permitted regarding to the plurality of objects;
    a touch panel that includes a touch sensor panel configured to detect a touch position as the input operation; and
    a processor coupled to the touch panel and configured to:
        set distance information to define an invalid area where the input operation is inhibited,
        determine, for each of the plurality of objects, whether a part of the respective object is overlapped with the invalid area;
        when it is determined that a part of a particular object of the plurality of objects is overlapped with the invalid area, update the distance information of the invalid area at the overlapped part of the particular object so that at least part of the overlapped part is removed from the invalid area and joins to the effective area; and
        exclude a part of the overlapped part from the invalid area such that a part of the particular object, which accounts for a predetermined ratio to the entire display area of the object, is contained in the invalid area.

2. The electronic device according to claim 1, wherein the processor is configured to:
    narrow the distance information of the invalid area at the overlapped part of the particular object such that the particular object does not overlap with the changed invalid area.

3. The electronic device according to claim 1, wherein the processor is configured to:
    individually set the distance information of the invalid area at each of different sides of the screen.

4. The electronic device according to claim 1,
    wherein the invalid area is provided in at least one of edge parts of the screen of the touch sensor panel, and
    the invalid area is set such that the invalid area does not overlap with an icon section used for operating a browser screen.

5. The electronic device according to claim 4,
    wherein the updated distance information of the invalid area at the icon section, along a horizontal direction of the touch panel, is narrower than the distance information of the invalid area.

6. The electronic device according to claim 1,
    wherein the processor is configured to narrow the distance information to a value having a predetermined percentage of the distance information of the invalid area.

7. The electronic device according to claim 6,
    wherein the predetermined percentage includes a first predetermined percentage corresponding to the invalid area set at a first side of the screen and a second predetermined percentage corresponding to the invalid area set at a second side of the screen, which is opposed to the first side, and
    the first predetermined percentage and the second predetermined percentage are different from each other.

8. The electronic device according to claim 1, wherein the processor is configured to:
    update the distance information along a horizontal direction of the touch panel.

9. The electronic device according to claim 1,
    wherein the invalid area information includes a first range of a first coordinates indicating a width of the invalid area and a second range of a second coordinates perpendicular to the first coordinates of the invalid area for each of a plurality of sides of the screen.

10. A control method executed by a processor included in an electronic device, the electronic device including a screen which displays a plurality of objects, the screen having an effective area where an input operation is permitted regarding to the plurality of objects, the control method comprising:
    setting distance information to define an invalid area where the input operation is inhibited;
    determining, for each of the plurality of objects, whether a part of the respective object is overlapped with the invalid area; and
    when it is determined that a part of a particular object of the plurality of objects is overlapped with the invalid area, updating the distance information of the invalid area at the overlapped part of the particular object so that at least part of the overlapped part is removed from the invalid area and joins to the effective area,
    wherein the updating includes
        excluding a part of the overlapped part from the invalid area such that a part of the particular object, which accounts for a predetermined ratio to the entire display area of the object, is contained in the invalid area.

11. The control method according to claim 10, wherein the changing includes:
    narrowing the distance information of the invalid area at the overlapped part of the particular object such that the particular object does not overlap with the changed invalid area.

12. The control method according to claim 10, wherein the setting includes
    individually setting the distance information of the invalid area at each of different sides of the screen.

13. A non-transitory computer-readable storage medium storing a program that causes a processor included in an electronic device to execute a process, the electronic device including a screen which displays a plurality of objects, the screen having an effective area where an input operation is permitted regarding to the plurality of objects and a touch panel that includes a touch sensor panel configured to detect a touch position as the input operation, the process comprising:
    setting distance information to define an invalid area where the input operation is inhibited;
    determining, for each of the plurality of objects, whether a part of the respective object is overlapped with the invalid area;
    when it is determined that a part of a particular object of the plurality of objects is overlapped with the invalid area, updating the distance information of the invalid area at the overlapped part of the particular object so that at least part of the overlapped part is removed from the invalid area and joins to the effective area,
wherein the updating includes
excluding a part of the overlapped part from the invalid area such that a part of the particular object, which accounts for a predetermined ratio to the entire display area of the object, is contained in the invalid area.

* * * * *